(12) United States Patent
Itzel et al.

(10) Patent No.: US 10,472,980 B2
(45) Date of Patent: Nov. 12, 2019

(54) GAS TURBINE SEALS

(71) Applicant: General Electric Company, Schenectady, NY (US)

(72) Inventors: Gary Michael Itzel, Simpsonville, SC (US); Ibrahim Sezer, Greenville, SC (US)

(73) Assignee: General Electric Company, Schenectady, NY (US)

( * ) Notice: Subject to any disclaimer, the term of this patent is extended or adjusted under 35 U.S.C. 154(b) by 249 days.

(21) Appl. No.: 15/432,094

(22) Filed: Feb. 14, 2017

(65) Prior Publication Data
US 2018/0230841 A1 Aug. 16, 2018

(51) Int. Cl.
*F01D 11/12* (2006.01)
*F01D 5/22* (2006.01)

(52) U.S. Cl.
CPC ............ *F01D 11/122* (2013.01); *F01D 5/225* (2013.01); *F05D 2250/283* (2013.01); *Y02T 50/673* (2013.01)

(58) Field of Classification Search
None
See application file for complete search history.

(56) References Cited

U.S. PATENT DOCUMENTS

| | | | | |
|---|---|---|---|---|
| 3,423,070 A | * | 1/1969 | Corrigan | F01D 11/127 277/414 |
| 3,603,599 A | * | 9/1971 | Laird | F01D 11/127 277/414 |
| 3,860,358 A | * | 1/1975 | Cavicchi | F01D 11/08 277/411 |
| 4,135,851 A | * | 1/1979 | Bill | F16J 15/441 415/173.3 |
| 4,669,955 A | * | 6/1987 | Pellow | F01D 11/125 415/173.4 |
| 6,164,904 A | * | 12/2000 | Abriles | B23K 1/0018 415/139 |
| 6,382,905 B1 | * | 5/2002 | Czachor | F01D 11/122 415/128 |
| 7,029,232 B2 | * | 4/2006 | Tuffs | F01D 11/127 415/173.1 |
| 8,061,965 B2 | * | 11/2011 | Daeubler | F01D 11/122 415/173.4 |
| 8,172,519 B2 | * | 5/2012 | Jarrabet | F01D 11/122 415/173.4 |
| 9,097,136 B2 | | 8/2015 | Chouhan et al. | |
| 9,803,497 B2 | * | 10/2017 | Le Biez | F01D 11/125 |
| 9,995,165 B2 | * | 6/2018 | Joe | F01D 11/08 |
| 10,030,532 B2 | * | 7/2018 | Eastman | F01D 11/122 |
| 2008/0284109 A1 | * | 11/2008 | Northfield | F01D 11/125 277/412 |

(Continued)

*Primary Examiner* — Michael Lebentritt
(74) *Attorney, Agent, or Firm* — Armstrong Teasdale LLP

(57) ABSTRACT

A seal in a gas turbine for sealing a radial gap defined between rotating and stationary structure. The rotating structure may include a row of rotor blades. The seal may include a pad attached to the stationary structure. The pad may include an abradable structure. The pad may further include a liner attached to and covering an outer surface of the abradable structure. The stationary structure to which the pad is attached may define an axial section of the outer radial boundary of the annular flowpath, the axial section coinciding axially with an axial position of the row of rotor blades.

19 Claims, 12 Drawing Sheets

(56) References Cited

U.S. PATENT DOCUMENTS

| | | | |
|---|---|---|---|
| 2009/0123722 A1* | 5/2009 | Allen | C23C 30/005 |
| | | | 428/220 |
| 2009/0277153 A1* | 11/2009 | Harper | F01D 11/122 |
| | | | 60/39.091 |
| 2011/0164961 A1* | 7/2011 | Taylor | C23C 4/06 |
| | | | 415/173.1 |
| 2014/0356142 A1* | 12/2014 | Arikawa | F01D 11/127 |
| | | | 415/173.4 |
| 2016/0123172 A1* | 5/2016 | Mondal | F01D 11/025 |
| | | | 415/136 |
| 2016/0160673 A1* | 6/2016 | Novikov | F01D 11/122 |
| | | | 415/173.4 |
| 2016/0186666 A1* | 6/2016 | Suciu | F01D 11/001 |
| | | | 415/1 |
| 2016/0215646 A1* | 7/2016 | Gonyou | F01D 11/025 |
| 2017/0175557 A1* | 6/2017 | Chouhan | F01D 11/001 |
| 2017/0268365 A1* | 9/2017 | Corcoran | F01D 11/08 |

\* cited by examiner

GAS TURBINE SEALS

BACKGROUND OF THE INVENTION

This present application relates to hot gas path sealing configurations in gas turbine engines. More specifically, but not by way of limitation, the present application relates to the seal formed between the outer radial tip of rotor blade and the surrounding stationary structure.

Generally, combustion or gas turbine engines (hereinafter "gas turbines") include compressor and turbine sections in which rows of blades are axially stacked in stages. Each stage typically includes a row of circumferentially-spaced stator blades, which are fixed, and a row of rotor blades, which rotate about a central turbine axis or shaft. In operation, generally, the compressor rotor blades are rotated about the shaft, and, acting in concert with the stator blades, compress a flow of air. This supply of compressed air is used within a combustor to combust a supply of fuel. The resulting flow of hot expanding combustion gases, which is often referred to as working fluid, is then expanded through the turbine section of the engine, wherein it is redirected by the stator blades onto the rotor blades so to induce rotation. The rotor blades are connected to a central shaft such that the rotation of the rotor blades rotates the shaft. In this manner, the energy contained in the fuel is converted into the mechanical energy of the rotating shaft, which, for example, may be used to rotate the rotor blades of the compressor, so to produce the supply of compressed air needed for combustion, as well as, for example, the coils of a generator so to generate electrical power. During operation, however, leakage across the rows of turbine blades negatively impacts engine efficiency.

Many industrial applications, such as those involving power generation and aviation, still rely heavily on gas turbines, and because of this, the engineering of more efficient engines remains an ongoing and important objective. As will be appreciated, even incremental advances in machine performance, efficiency, or cost-effectiveness are meaningful in the highly competitive markets that have evolved around this technology. While there are several known strategies for improving the efficiency of gas turbines, such as, for example, increasing the size of the engine, firing temperatures, or rotational velocities, each of these generally places additional strain on those already highly stressed hot-gas path components. Another manner by which gas turbine engine efficiency may be enhanced is through improved sealing technology, particular relating to the seals formed within the gaps defined between stationary and rotating structure within the gas turbine. As will be appreciated, during operation, working fluid that flows between the outer radial tip of the rotor blade and the surrounding stationary structure represents leakage that negatively impacts efficiency. As a result, there remains a need for improved apparatus, systems, and methods that reduce or eliminate such leakage flows.

BRIEF DESCRIPTION OF THE INVENTION

The present application thus describes a seal in a gas turbine for sealing a radial gap defined between a rotating structure and a stationary structure. The rotating structure may include a row of rotor blades. The seal may include a pad attached to the stationary structure. The pad may include an abradable structure. The pad may further include a liner attached to and covering an outer surface of the abradable structure.

The present application may further describe a seal in a gas turbine for sealing a radial gap defined between a rotating structure and a stationary structure where the rotating structure includes circumferentially arranged rotor blades that each include a tip shroud supported at an outboard tip of an airfoil. The seal may include seal rails protruding from the outboard surface of the tip shroud. The seal rails may include a forward seal rail that is positioned forward of and oriented substantially parallel to an aftward seal rail. A forward pad may attach to the stationary structure so to align axially with the forward seal rail, while an aftward pad may attach to the stationary structure so to align axially with the aftward tip shroud. The forward pad may include an abradable structure, and a liner that attaches to and covers an outer surface of the abradable structure. The aftward pad may include an abradable structure, and a liner that attaches to and covers an outer surface of the abradable structure.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
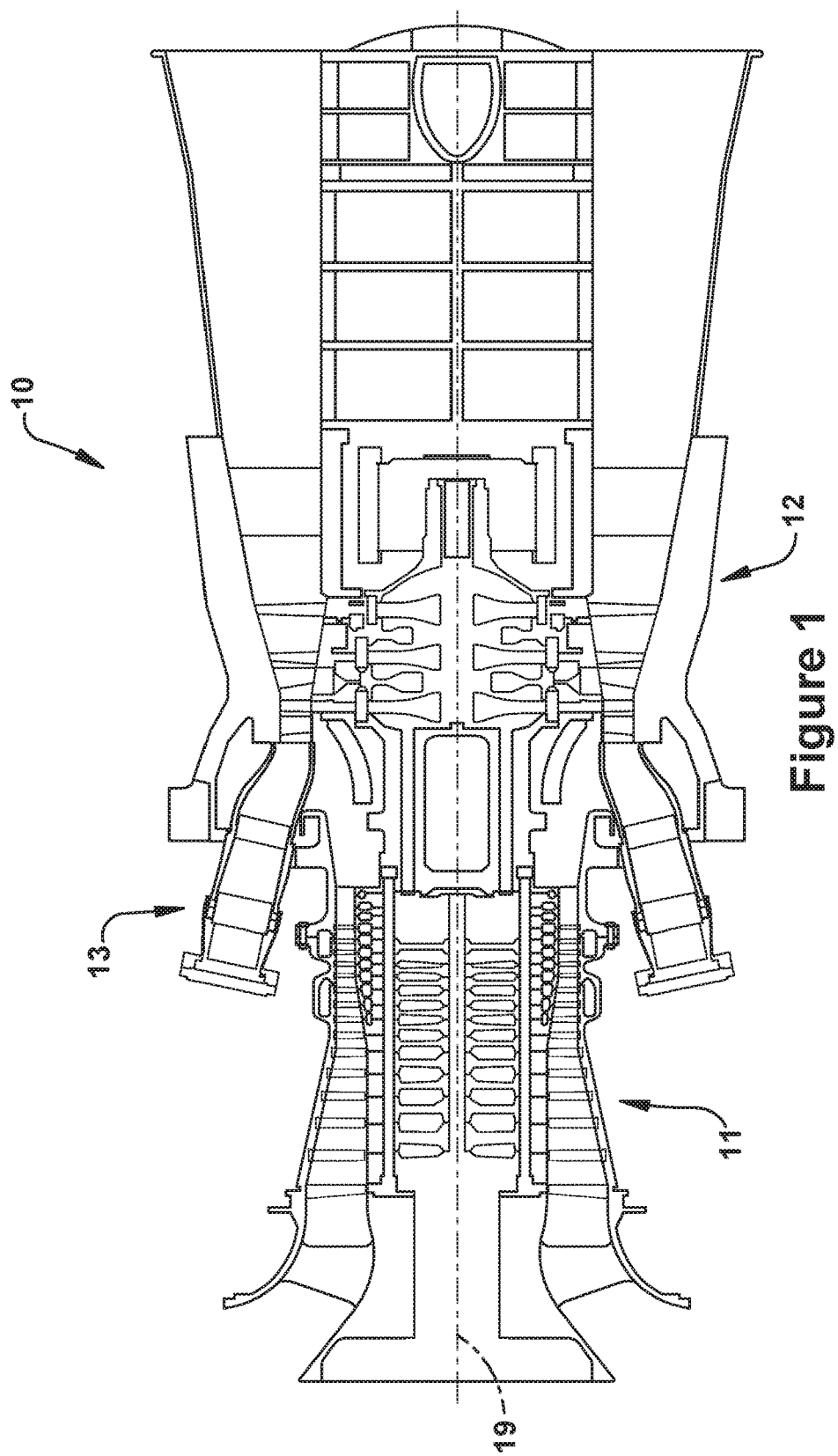
FIG. 1 is a schematic representation of an exemplary gas turbine that may include turbine blades according to aspects and embodiments of the present application.

Aspects and advantages of the present application are set forth below in the following description, or may be obvious from the description, or may be learned through practice of the invention. Reference will now be made in detail to present embodiments of the invention, one or more examples of which are illustrated in the accompanying drawings. The detailed description uses numerical designations to refer to features in the drawings. Like or similar designations in the drawings and description may be used to refer to like or similar parts of embodiments of the invention. As will be appreciated, each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. It is intended that the present invention covers such modifications and variations as come within the scope of the appended claims and their equivalents. It is to be understood that the ranges and limits mentioned herein include all sub-ranges located within the prescribed limits, inclusive of the limits themselves unless otherwise stated. Additionally, certain terms have been selected to describe the present invention and its component subsystems and parts. To the extent possible, these terms have been chosen based on the terminology common to the technology field. Still it will be appreciate that such terms often are subject to differing interpretations. For example, what may be referred to herein as a single component, may be referenced elsewhere as consisting of multiple components, or, what may be referenced herein as including multiple components, may be referred to elsewhere as being a single component. Thus, in understanding the scope of the present invention, attention should not only be paid to the particular terminology used, but also to the accompanying description and context, as well as the structure, configuration, function, and/or usage of the component being referenced and described, including the manner in which the term relates to the several figures, as well as, of course, the precise usage of the terminology in the appended claims. Further, while the following examples are presented in relation to certain types of gas turbines or turbine engines, the technology of the present application also may be applicable to other categories of turbine engines, without limitation, as would the understood by a person of ordinary skill in the relevant technological arts. Accordingly, it should be understood that unless otherwise stated, the usage herein of the term "gas turbine" is intended broadly and with limitation as the applicability of the present invention to the various types of turbine engines.

Given the nature of how gas turbines operate, several terms prove particularly useful in describing certain aspects of their function. As will be understood, these terms may be used both in describing or claiming the gas turbine or one of the subsystems thereof—e.g., the compressor, combustor, or turbine—as well as to describe or claim components or subcomponents for usage therewithin. In the latter case, the terminology should be understood as describing those components as they would be upon proper installation and/or function within the gas turbine engine or primary subsystem. These terms and their definitions, unless specifically stated otherwise, are as follows.

The terms "forward" and "aftward" refer to directions relative to the orientation of the gas turbine and, more specifically, the relative positioning of the compressor and turbine sections of the engine. Thus, as used therein, the term "forward" refers to the compressor end while "aftward" refers to the turbine end. It will be appreciated that each of these terms may be used to indicate direction of movement or relative position along the central axis of the engine. As stated above, these terms may be used to describe attributes of the gas turbine or one of its primary subsystems, as well as for components or subcomponents positioned therewithin. Thus, for example, when a component, such as a rotor blade, is described or claimed as having a "forward face", it may be understood as referring to a face that faces toward the forward direction as defined by the orientation of the gas turbine (i.e., the compressor being designated as the forward end and turbine being designated as the aftward end). To take a major subsystem like the turbine as another example (and assuming a typical gas turbine arrangement such as the one shown in FIG. 1), the forward and aftward directions may be defined relative to a forward end of the turbine, at where a working fluid enters the turbine, and an aftward end of the turbine, at where the working fluid exits the turbine.

The terms "downstream" and "upstream" are used herein to indicate position within a specified conduit or flowpath relative to the direction of flow (hereinafter "flow direction") moving through it. Thus, the term "downstream" refers to the direction in which a fluid is flowing through the specified conduit, while "upstream" refers to the direction opposite that. These terms may be construed as referring to the flow direction through the conduit given normal or anticipated operation. As will be appreciated, within the compressor and turbine sections of the gas turbine, the working fluid is directed downstream and through an annularly shaped working fluid flowpath, which is typically defined about the central and common axis of the gas engine. As such, within the compressor and turbine sections of the engine, the term "flow direction", as used herein, refers to a reference direction representing an idealized direction of flow of working fluid through the working fluid flowpath of the engine during an expected or normal condition of operation. Thus, within the compressor and turbine sections, the "flow direction" terminology is referring to flow that is parallel to the central axis of the gas turbine and oriented in the downstream or aftward direction.

Thus, for example, the flow of working fluid through the working fluid flowpath of the gas turbine may be described as beginning as air pressurized through the compressor per the flow direction, becoming combustion gases in the combustor upon being combusted with a fuel, and, finally, being expanded per the flow direction as it passed through the turbine. Likewise, the flow of working fluid may be described as beginning at a forward or upstream location toward a forward or upstream end of the gas turbine, moving generally in a downstream or aftward direction, and, finally, terminating at an aftward or downstream location toward an aftward or downstream end of the gas turbine.

As many components of gas turbines rotate during operation, such as compressor and turbine rotor blades, the terms "rotationally lead" and "rotationally trail" may be used to delineate relative positioning of areas or subregions on a rotating component per the expected direction of rotation within the engine. Thus, as will be appreciated, these terms may differentiate positioning relative to the direction of rotation (hereinafter "rotation direction") within the compressor or turbine. As should be appreciated, the rotation direction refers to the expected direction of rotation for a component given normal or anticipated operation of the gas turbine.

In addition, given the configuration of gas turbines, particularly the arrangement of the compressor and turbine sections about a common shaft or rotor, as well as the cylindrical configuration common to many combustor types, terms describing position relative to an axis may be regularly used herein. In this regard, it will be appreciated that the term "radial" refers to movement or position perpendicular to an axis. Related to this, it may be required to describe relative distance from the central axis. In such cases, for example, if a first component resides closer to the central axis than a second component, the first component will be described as being either "radially inward" or "inboard" of the second component. If, on the other hand, the first component resides further from the central axis, the first component will be described as being either "radially outward" or "outboard" of the second component. As used herein, the term "axial" refers to movement or position parallel to an axis, while the term "circumferential" refers to movement or position around an axis. Unless otherwise stated or plainly contextually apparent, these terms should be construed as relating to the central axis of the compressor and/or turbine sections of the gas turbine as defined by the rotor extending through each, even if the terms are describing or claiming attributes of non-integral components—such as rotor or stator blades—that function therein. When otherwise stated, the terms may be used relative to the longitudinal axis of certain components or subsystems within the gas turbine, such as, for example, the longitudinal axis around which conventional cylindrical or "can" combustors are typically arranged.

Finally, the term "rotor blade", without further specificity, is a reference to the rotating blades of either the compressor or the turbine, and so may include both compressor rotor blades and turbine rotor blades. The term "stator blade", without further specificity, is a reference to the stationary blades of either the compressor or the turbine and so may include both compressor stator blades and turbine stator blades. The term "blades" may be used to generally refer to either type of blade. Thus, without further specificity, the term "blades" is inclusive to all type of turbine engine blades, including compressor rotor blades, compressor stator blades, turbine rotor blades, turbine stator blades and the like.

Figure 2:
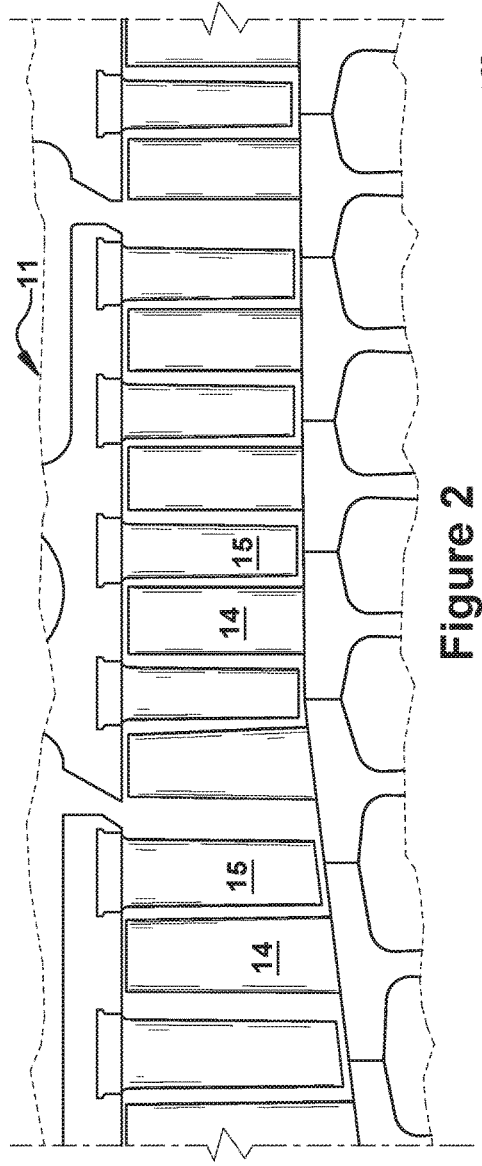
FIG. 2 is a sectional view of the compressor section of the gas turbine of FIG. 1.
Figure 3:
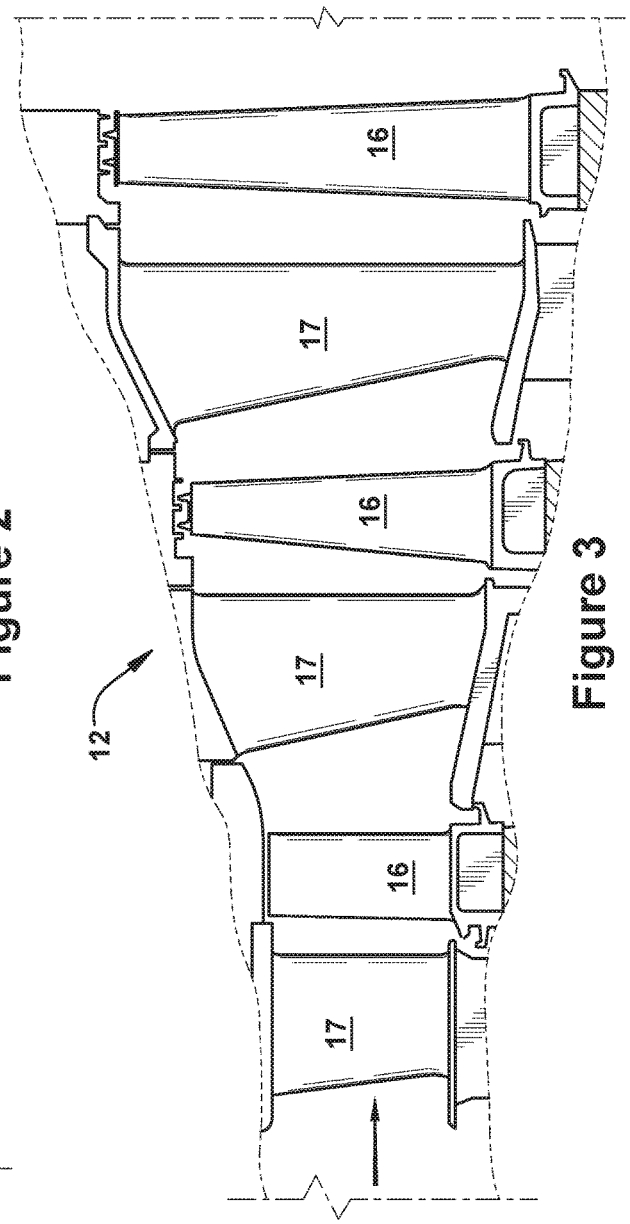
FIG. 3 is a sectional view of the turbine section of the gas turbine of FIG. 1.
Figure 4:
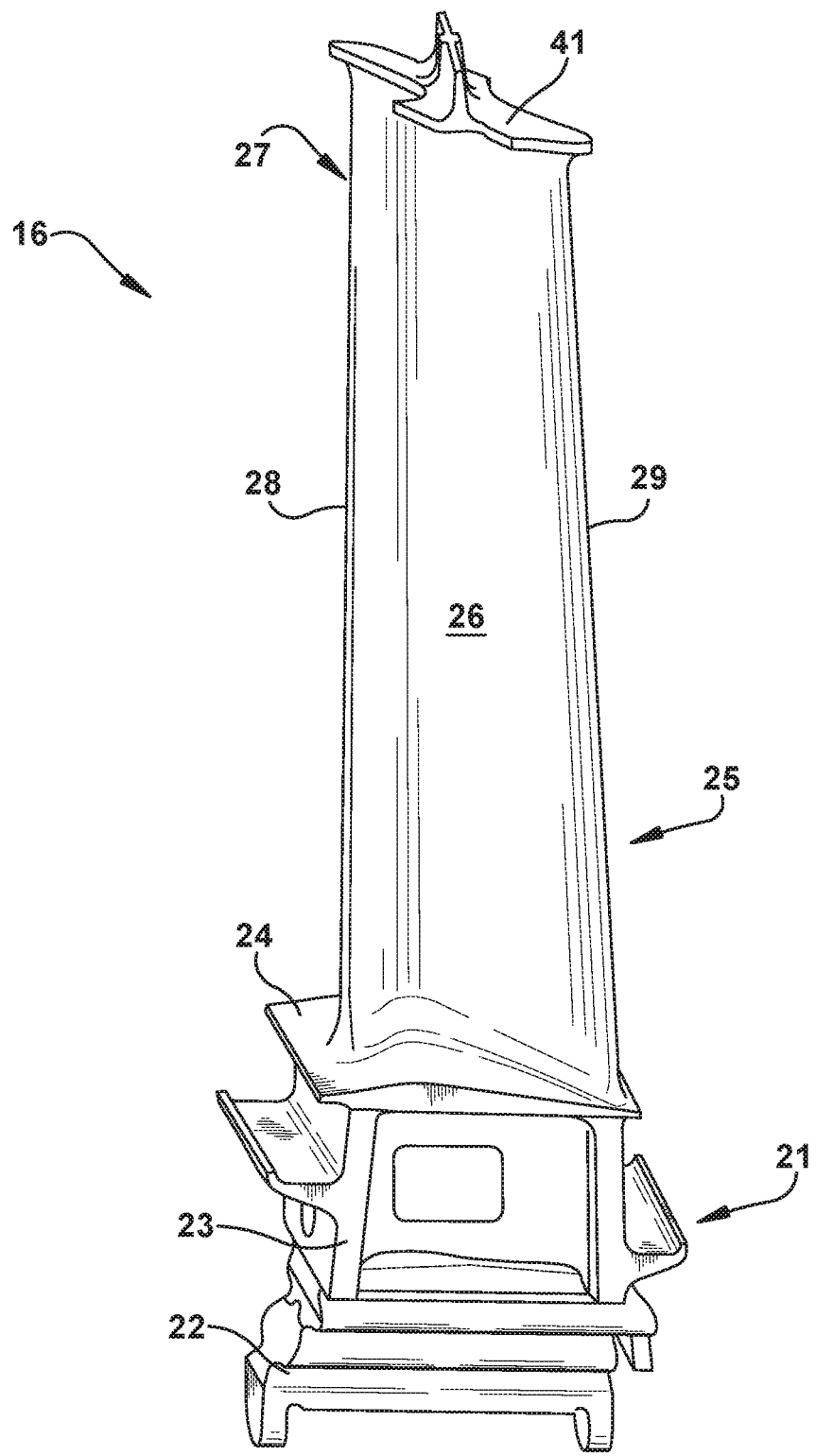
FIG. 4 is a perspective view of an exemplary turbine rotor blade having a conventional tip shroud.

By way of background, referring now with specificity to the figures, FIGS. 1 through 3 illustrate an exemplary gas turbine in accordance with the present invention or within which the present invention may be used. It will be understood by those skilled in the art that the present invention may not be limited to this type of usage. As stated, the present invention may be used in gas turbines, such as the engines used in power generation and airplanes, steam turbine engines, as well as other types of rotary engines as would be recognized by one of ordinary skill in the art. The examples provided, thus, are not meant to be limiting unless otherwise stated. FIG. 1 is a schematic representation of a gas turbine 10. In general, gas turbines operate by extracting energy from a pressurized flow of hot gas produced by the combustion of a fuel in a stream of compressed air. As illustrated in FIG. 1, gas turbine 10 may be configured with an axial compressor 11 that is mechanically coupled by a common shaft or rotor to a downstream turbine section or turbine 12, and a combustor 13 positioned between the compressor 11 and the turbine 12. As illustrated in FIG. 1, the gas turbine may be formed about a common central axis 19.

FIG. 2 illustrates a view of an exemplary multi-staged axial compressor 11 that may be used in the gas turbine of FIG. 1. As shown, the compressor 11 may have a plurality of stages, each of which include a row of compressor rotor blades 14 and a row of compressor stator blades 15. Thus, a first stage may include a row of compressor rotor blades 14, which rotate about a central shaft, followed by a row of compressor stator blades 15, which remain stationary during operation. FIG. 3 illustrates a partial view of an exemplary turbine section or turbine 12 that may be used in the gas turbine of FIG. 1. The turbine 12 also may include a plurality of stages. Three exemplary stages are illustrated, but more or less may be present. Each stage may include a plurality of turbine nozzles or stator blades 17, which remain stationary during operation, followed by a plurality of turbine buckets or rotor blades 16, which rotate about the shaft during operation. The turbine stator blades 17 generally are circumferentially spaced one from the other and fixed about the axis of rotation to an outer casing. The turbine rotor blades 16 may be mounted on a turbine wheel or rotor disc (not shown) for rotation about a central axis. It will be appreciated that the turbine stator blades 17 and turbine rotor blades 16 lie in the hot gas path or working fluid flowpath through the turbine 12. The direction of flow of the combustion gases or working fluid within the working fluid flowpath is indicated by the arrow.

In one example of operation for the gas turbine 10, the rotation of compressor rotor blades 14 within the axial compressor 11 may compress a flow of air. In the combustor 13, energy may be released when the compressed air is mixed with a fuel and ignited. The resulting flow of hot gases or working fluid from the combustor 13 is then directed over the turbine rotor blades 16, which induces the rotation of the turbine rotor blades 16 about the shaft. In this way, the energy of the flow of working fluid is transformed into the mechanical energy of the rotating blades and, given the connection between the rotor blades and the shaft, the rotating shaft. The mechanical energy of the shaft may then be used to drive the rotation of the compressor rotor blades 14, such that the necessary supply of compressed air is produced, and/or, for example, a generator to produce electricity.

For background purposes, FIGS. 4 through 8 provide views of conventional shrouded turbine rotor blades 16 and related sealing structures. With particular attention now to FIG. 4, the rotor blade 16 may include a root 21 that is configured for attaching to a rotor disc. The root 21, for example, may include a dovetail 22 configured for mounting in a corresponding dovetail slot in the perimeter of a rotor disc. The root 21 may further include a shank 23 that extends between the dovetail 22 and a platform 24. The platform 24, as shown, generally forms the junction between the root 21 and an airfoil 25, with the airfoil being the active component of the rotor blade 16 that intercepts the flow of working fluid through the turbine 12 and induces the desired rotation. The platform 24 may define the inboard end of the airfoil 25. The platform 24 also may define a section of the inboard boundary of the working fluid flowpath through the turbine 12.

The airfoil 25 of the rotor blade typically includes a concave pressure face 26 and a circumferentially or laterally opposite convex suction face 27. The pressure face 26 and suction face 27 may extend axially between opposite leading and trailing edges 28, 29, respectively, and, in the radial direction, between an inboard end, which may be defined at the junction with the platform 24, and an outboard tip, which may include a tip shroud 41. The airfoil 25 may include a curved or contoured shape that is designed for promoting desired aerodynamic performance. The rotor blade 16 may further include an internal cooling configuration having one or more cooling channels through which a coolant is circulated during operation. Such cooling channels may extend radially outward from a connection to a supply source formed through the root 21 of the rotor blade 16. The cooling channels may be linear, curved or a combination thereof, and may include one or more outlet or surface ports through which coolant is exhausted from the rotor blade 16 and into the working fluid flowpath.

As used herein, the rotor blade 16 and components thereof may be described according to orientation characteristics of the turbine 12. It should be appreciated that, in such cases, the rotor blade 16 is assumed to be properly installed within the turbine 12. Such orientation characteristics may include radial, axial, and circumferential directions defined relative to the central axis 19 of the turbine 12. Forward and aftward directions may be defined relative to a forward end of the turbine 12, at where the working fluid enters the turbine 12 from the combustor 13, and an aftward end of the turbine 12, at where the working fluid exits the turbine 12. A rotation direction may be defined relative to an expected direction of rotation of the rotor blade 16 about the central axis 19 of the turbine 13 during operation. As will be appreciated, according to these orientation characteristics, the seal rail 42 may be described as projecting from the outboard surface 44 of the tip shroud 41 along an axis approximately aligned with the radial direction to define a height. The seal rail 42 may extend along an axis approximately aligned with the circumferential direction to define a length. As illustrated, relative to the length, the seal rail 42 may have a narrow thickness that extends along an axis approximately aligned with the axial direction.

Figure 5:
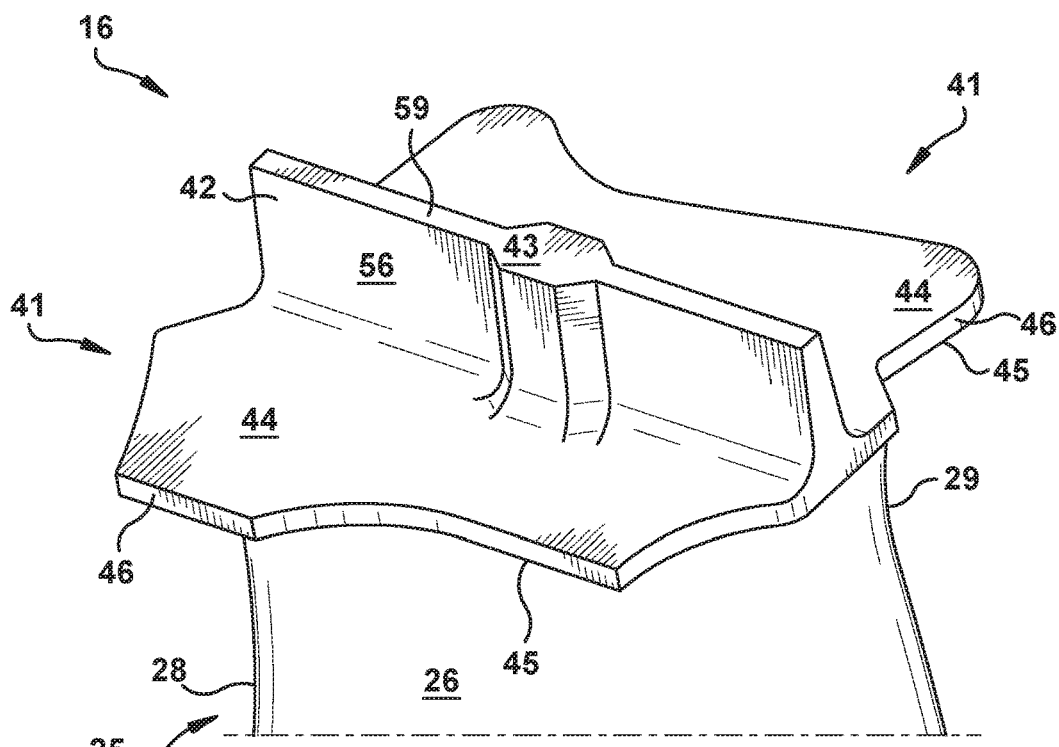
FIG. 5 is a perspective view of a tip shroud of a conventional turbine rotor blade having a single seal rail.
Figure 6:
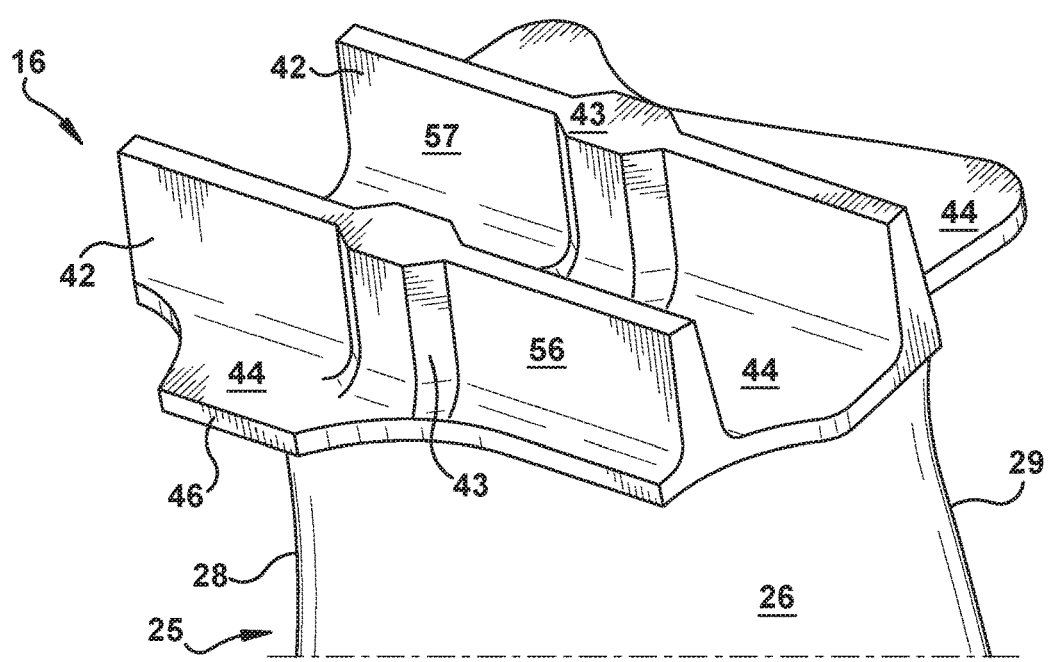
FIG. 6 is a perspective view of a tip shroud of a conventional turbine rotor blade having a two seal rails.

With particular reference now to FIGS. 5 and 6, the tip shroud 41 may be positioned near or at the outboard end of the airfoil 25. The tip shroud 41, generally, may include an axially and circumferentially extending planar component, which is supported towards its center by the airfoil 25. For descriptive purposes and as used herein, the tip shroud 41 includes an inboard surface 45 and an outboard surface 44, as well as a shroud edge or edge 46. The inboard surface 45 generally opposes the outboard surface 44 across the narrow radial thickness of the tip shroud 41. The edge 46 of the tip shroud 41 connects the inboard surface 45 to the outboard surface 44. As used herein, the edge 46 of the tip shroud 41 defines a peripheral profile or shape of the tip shroud 41.

The tip shroud 41 also may include one or more seal rails 42 projecting from the outboard surface 44. As illustrated, FIG. 5 shows a tip shroud 41 that has a single seal rail 42, while the tip shroud 41 of FIG. 6 shows one having dual seal rails 42. In general, the seal rail 42 is a fin-like projection that extends radially outward from the outboard surface 44 of the tip shroud 41. The seal rail 42 may extend circumferentially between opposite ends of the tip shroud 41, and may be described as circumferentially aligned or, put another way, aligned relative to the direction of rotation of the rotor blade 16. The seal rail 42 may extend across substantially the entire circumferential length of the outboard surface 44 of the tip shroud 41. Each of the one or more seal rails 42 may include a cutter tooth 43. In general terms, the cutter tooth 43 is an area of increased width along the circumferential length of the seal rail 42. For descriptive purposes and as used herein, where two of the seal rails 42 are provided on the tip shroud 41, a "forward seal rail 56" is differentiated from an "afterward seal rail 57". Specifically, the forward seal rail 56 corresponds to the forward direction of the gas turbine, while the aftward seal rail 57 corresponds with the aftward direction.

Figure 7:
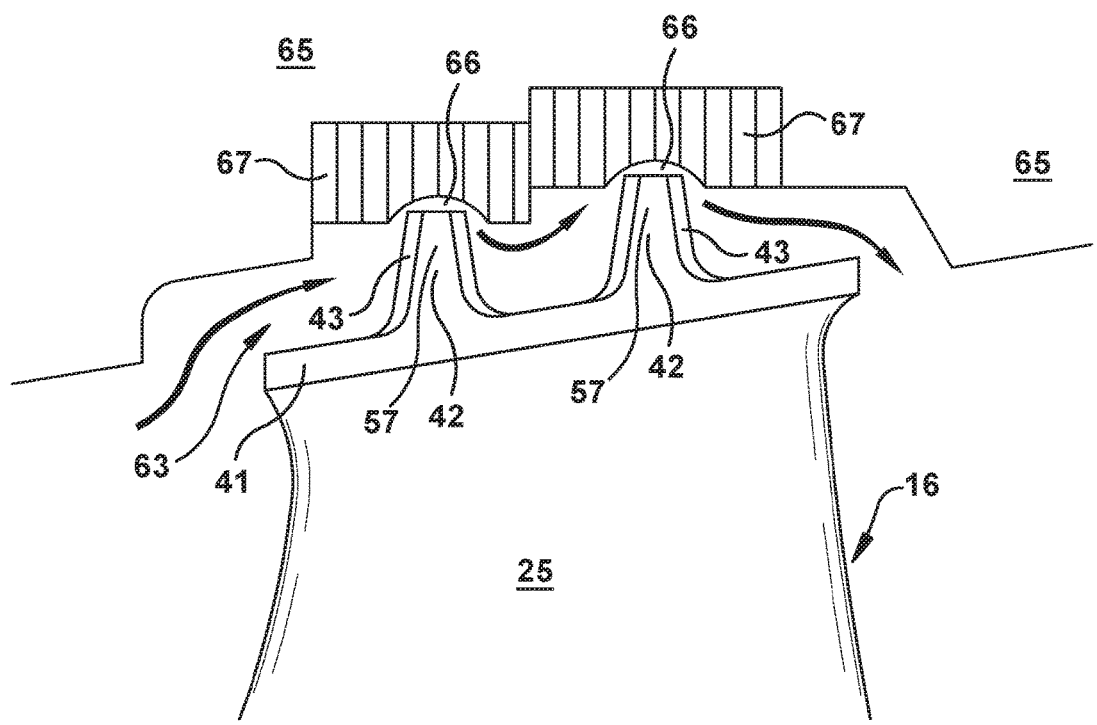
FIG. 7 is a side view of an exemplary seal formed between the outer radial tip of a shrouded turbine rotor blade and the stationary structure that surrounds it.

With reference now to FIG. 7, as will be appreciated, seals are used throughout gas turbines to limit leakage through the gaps that necessarily occur between rotating and stationary structure. As this leakage negatively impacts engine efficiency, the effectiveness of these seals is a significant consideration. As shown in FIG. 7, one such seal is shown, a seal 63, which may be used to deter over the tip leakage across a stage or row of rotor blades. As illustrated, the seal 63 may include a seal rail 42 that extends radially from the tip shroud 41 of a rotor blade 16. In this manner, the seal rail 42 narrows the distance between the rotor blade 16 and the stationary structure 65 that surrounds the rotor blade 16, and, thereby, narrows the radial gap 66 that occurs there. As further shown, the seal 63 may utilize the seal rail 42 in conjunction with a stationary abradable shroud or structure (hereinafter "abradable structure") 67 that attaches to the stationary structure 65. In this way, the seal 63 forms an interface between the seal rails 41 of rotor blade 16 and the abradable structure 67 so to further narrow the distance between the rotating and stationary structure in this region. As indicated, the abradable structure 67 may be positioned so to directly oppose and axially align with the tip shroud 41 across the radial gap 66 formed therebetween. As will be appreciated, in operation, thermal expansion within the engine generally causes relative movement between stationary and rotating structures so that the seal rail 42 moves radially so that, as indicated, the seal rail 42 cuts into the abradable structure 67 and, thereby, further restricts the leakage path through the radial gap 66. In this manner, the abradable structure 67 is utilized to enhance seal stability and further limit leakage. The use of the cutter tooth 43 on the seal rail 42 may reduce rubbing between stationary and rotating parts by initially clearing a wider path through the abradable structure 67. The cutter tooth 43 thus cuts a groove in the abradable structure 67 that is slightly wider than the width of the seal rail 42.

Figure 8:
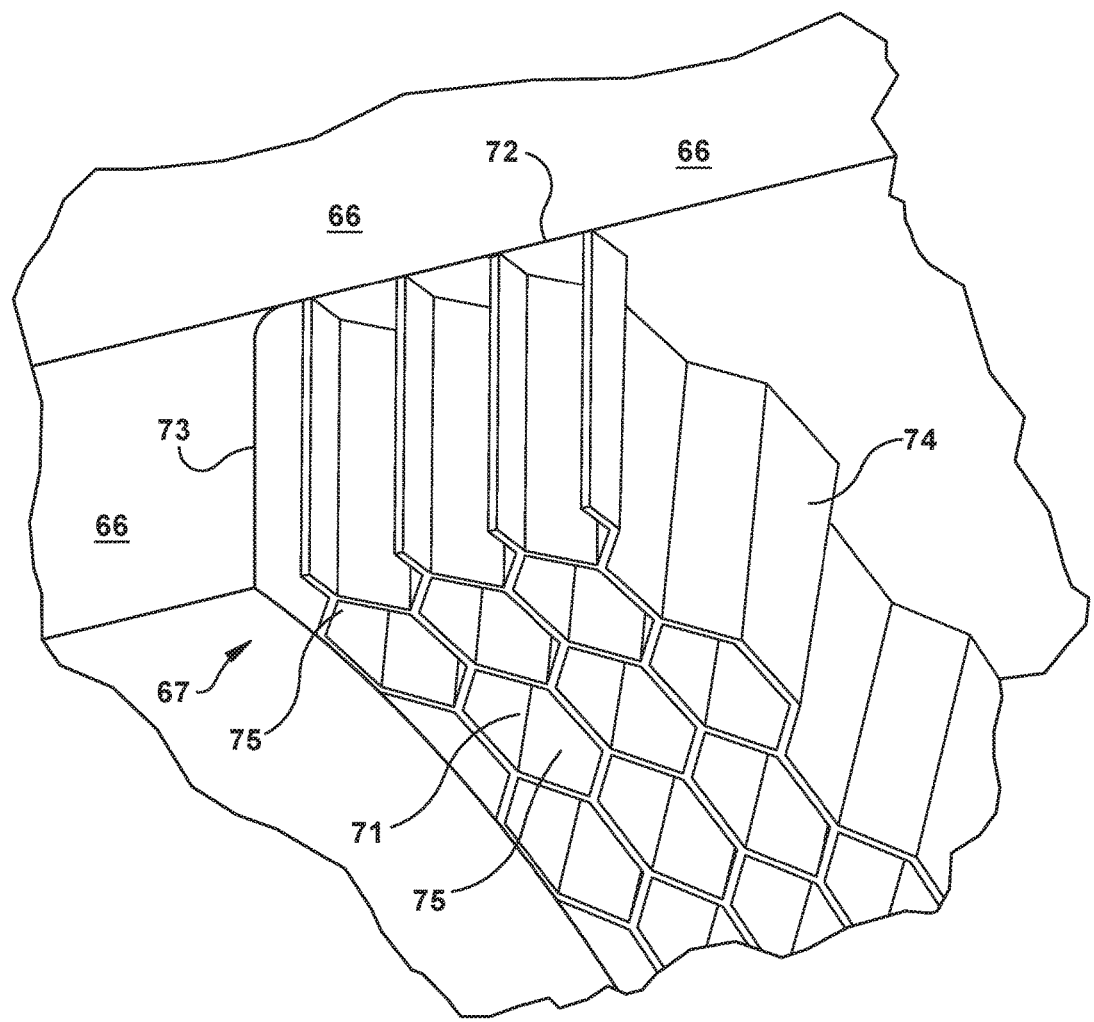
FIG. 8 is a perspective view of an exemplary abradable structure of a seal in accordance with certain embodiments of the present invention.

With reference now to both FIGS. 7 and 8, a perspective view of an exemplary abradable structure 67 is provided in FIG. 8 that should prove useful in describing certain aspects of the abradable structure 67. As will be appreciated, because it is meant to be worn away by the seal rail 42 without damaging the rotor blade 16, the abradable structure 67 typically is mostly hollow. To achieve this, the abradable structure 67 typically is made up of a repeating pattern of thin-walled cells 75. As described more below, these thin-walled cells 75 may be arranged parallel to each other and oriented such that each extends across the radial thickness of the abradable structure 67 so that each cell connects openings formed on the opposing outer surfaces of the abradable structure 67.

The outer surfaces of the abradable structure 67 may be defined according to their particular orientation in relation to the working fluid flowpath and/or the row of rotor blades. For example, as used herein, the abradable structure 67 is defined as including an inboard outer surface 71 and an outboard outer surface 72. As indicated, the inboard outer surface 71 of the abradable structure 67 is the outer surface that directly opposes the row of rotor blades across the radial gap 66, whereas the outboard outer surface 72 of the abradable structure 67 is the outer surface that faces the stationary structure 65 and attaches thereto. The abradable structure 67 is further defined as having a forward outer surface 73 and an aftward outer surface 74. As indicated in the figures, the forward outer surface 73 is the outer surface that extends between the inboard outer surface 71 and the outboard outer surface 72 at a forward end of the abradable structure 67, whereas the aftward outer surface 74 is the outer surface that extends between the inboard outer surface 71 and the outboard outer surface 72 at an aftward end of the abradable structure 67.

As already stated, the abradable structure 67 may be one that is made up of cells 75 that are separated from neighboring cells 75 by thin continuous walls. As shown, such cells 75 may be arranged parallel to each other and oriented such that each extends between an opening formed on the inboard outer surface 71 and an opening formed on the outboard outer surface 72 of the abradable structure 67. The cells 75 may maintain a substantially constant cross-sectional shape between the openings formed on the inboard and outboard outer surface 71, 72 of the abradable structure 67. This cross-sectional shape may take many forms, including rectangular, triangular, circular, and hexagonal, with the hexagonal "honeycomb" shape being one that is particularly common and functional.

As indicated, because of the configuration described above, the outer surfaces of the abradable structure 67 that are exposed to the hot gas path and the flow of working fluid are surfaces that are rough and uneven. For example, given the common cell configuration where cells extend through the abradable structure 67, the inboard outer surface 71 of the abradable structure 67 usually has a repeating pattern of openings that are exposed to the hot gas path. In addition, this common cell configuration typically results in the forward and aftward outer surfaces 73, 74 of the abradable structure 67 having a surface that is corrugated or deeply notched in appearance. More specifically, in such case, the forward and aftward outer surfaces 73, 74 of the abradable structure 67 include a series of parallel ridges and furrows that extend longitudinally between the inboard outer surface 71 and the outboard outer surface 72. (It should be appreciated that other types of abradable structures 67 also have rough surfaces that interact with the hot gas path, and that the present invention may be used with any type of rough, uneven surface, or one, generally, that includes relative high and low points that makes the surface rough or uneven instead of smoothly planar.) Through extensive CFD analysis and test data, the inventors of the present application discovered that the drag associated with such rough surfaces—or other surface types have a similar unevenness and/or drag characteristics—significantly increases the cavity air temperature surrounding the tip shroud of the rotor blade due to windage. Because the tip shroud is directly exposed to this hotter cavity flow, this results in this region of the rotor blade operating at an elevated temperature. These increased temperatures—even if only slight—can lead to significant increases to creep rates and, thus, shorter part life and reduced engine performance. These negative effects have been found to be exaggerated when the tip shroud of the rotor blade utilizes a dual seal rail designs, which is a design that is being utilized with more frequency to improve engine performance by further reducing over the tip leakage.

Turning now to FIGS. 9 through 15, the present invention will be discussed in relation to several exemplary embodiments. As will be appreciated, these embodiments include adding a thin, abradable and hydraulically smooth liner to one or more of the rough outer surfaces of the abradable structure to reduce roughness and the drag characteristics associated with it. The combined article—i.e. the abradable structure and the liner which together are referred to herein as a "pad"—has been found to reduce drag of the seal and, in turn, the temperatures surrounding seal. Specifically, this reduces the temperature of the over the tip leakage, which reduces the operating temperatures of the outer radial region of the rotor blade. As one of ordinary skill in the art will appreciate, this region of the rotor blade is structurally critical, where even relatively minor reductions in operating temperatures result reduce creep and materially lengthen part life, as well as enhance blade performance over that longer life. Further, these benefits are achieved without adding coolant flow to the rotor blade, which avoids the negative effect on efficiency that such coolant flows cause. As will be seen, multiple options for placement of the liner are possible, with each having shown beneficial results. For example, according to certain preferred embodiments, the liner may be configured to cover the outboard outer surface of the abradable structure, the aftward outer surface of the abradable structure, and/or both surfaces.

Figure 9:
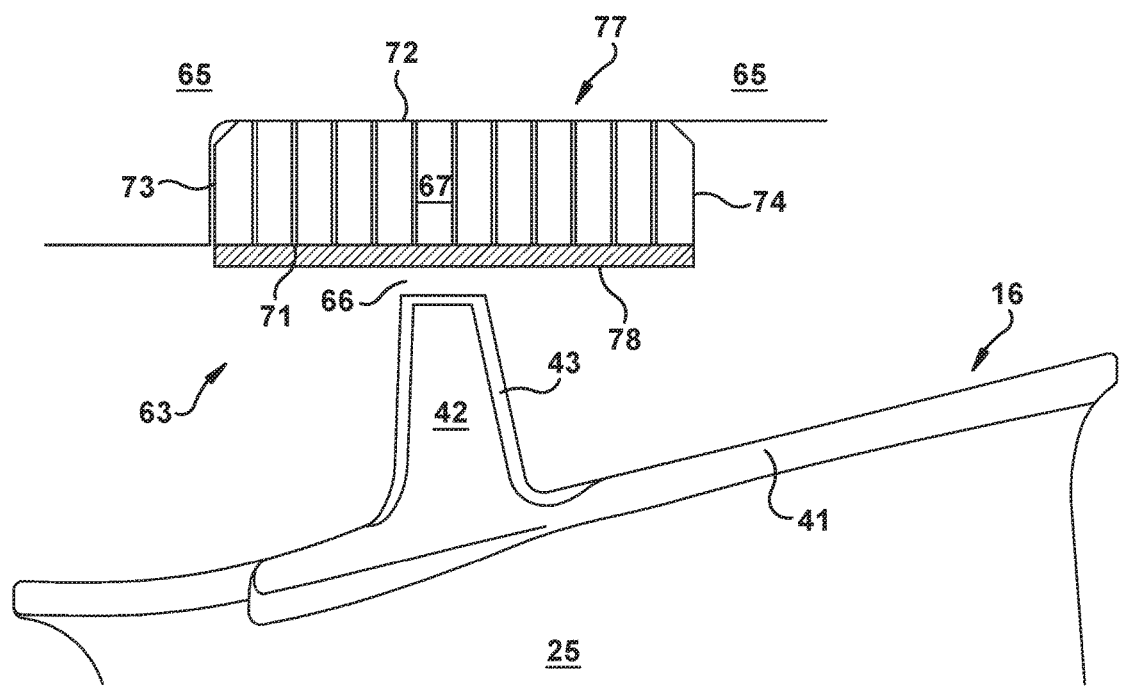
FIG. 9 is a section view of a tip shroud and abradable structure with a liner in accordance with an exemplary embodiment of the seal of the present invention.
Figure 10:
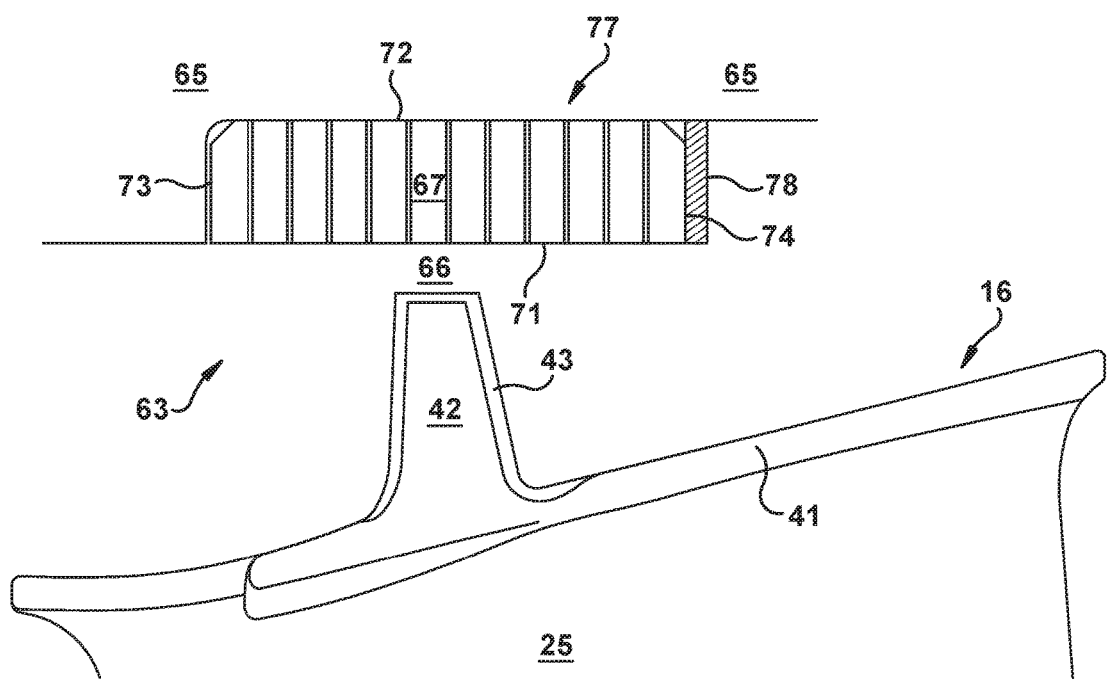
FIG. 10 is a section view of a tip shroud and abradable structure with a liner in accordance with alternative embodiments of the seal of the present invention.

According to exemplary embodiments, the seal 63 may include pad 77 made up of an abradable structure 76 and a liner 78 that covers an outer surface of that abradable structure 67. In such cases, as illustrated in FIGS. 9, 11, 12, and 14, the liner 76 may be applied to the abradable structure 67 so that it covers all or a portion of the inboard outer surface 71. As shown in FIG. 9, for example, the liner 78 may extend axially between the forward and aftward ends of the abradable structure 76. Attached in this manner to the inboard outer surface 71, the liner 78 may also extend circumferentially about (i.e., around) the flowpath of the turbine.

Figure 11:
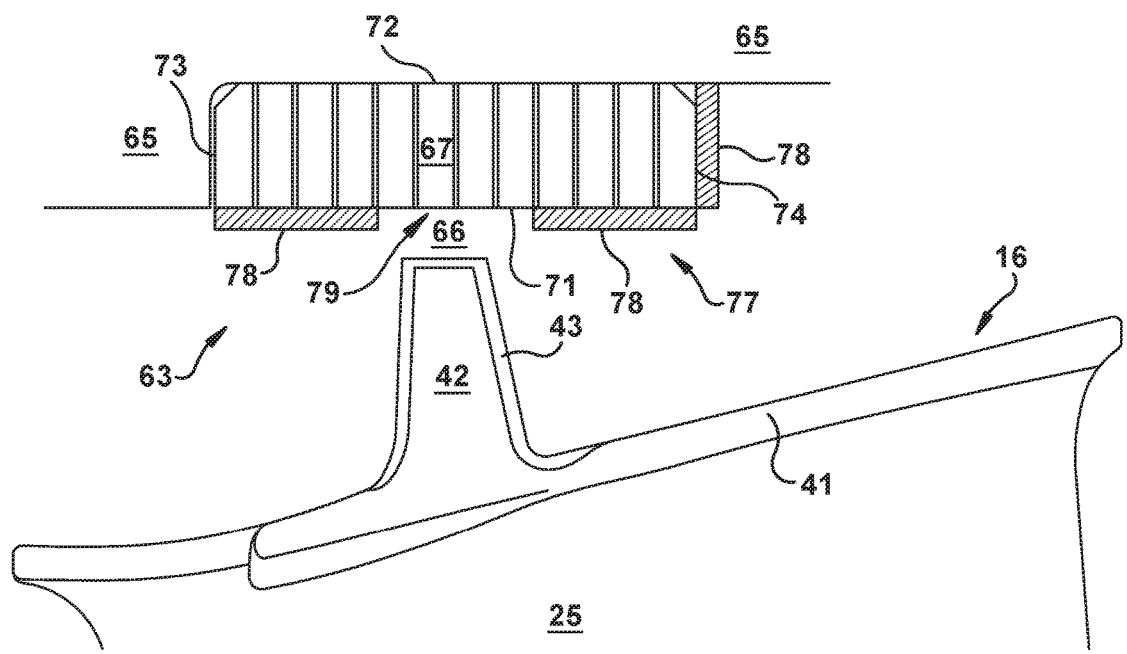
FIG. 11 is a section view of a tip shroud and abradable structure with a liner in accordance with alternative embodiments of the seal of the present invention.

As shown in FIG. 11, the seal 63 may include a pad 77 in which the liner 78 is configured so to include a coverage window 79. The coverage window 79, as indicated, includes an axially defined region of the inboard outer surface 71 in which the liner 78 is omitted. This omitted region, thus, is flanked to each side by an axially defined region of the inboard outer surface 71 that is covered by the liner 78. The coverage window 79, for example, may be provided so that the seal rail does not have to cut through the line 78 before cutting into the abradable structure 67. Thus, as illustrated, according to a preferred embodiment, a center of the coverage window 79 may axially align with the seal rail 42 of the rotor blade 16.

Figure 12:
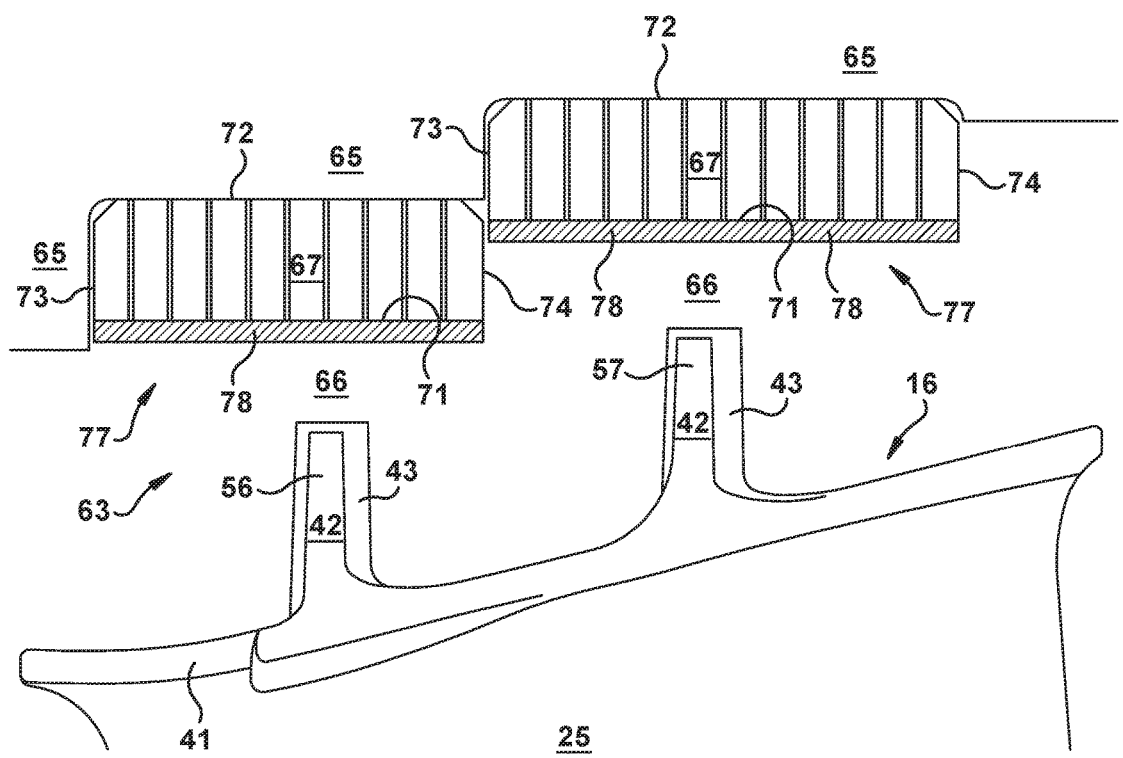
FIG. 12 is a section view of a tip shroud and abradable structure with a liner in accordance with alternative embodiments of the seal of the present invention.
Figure 13:
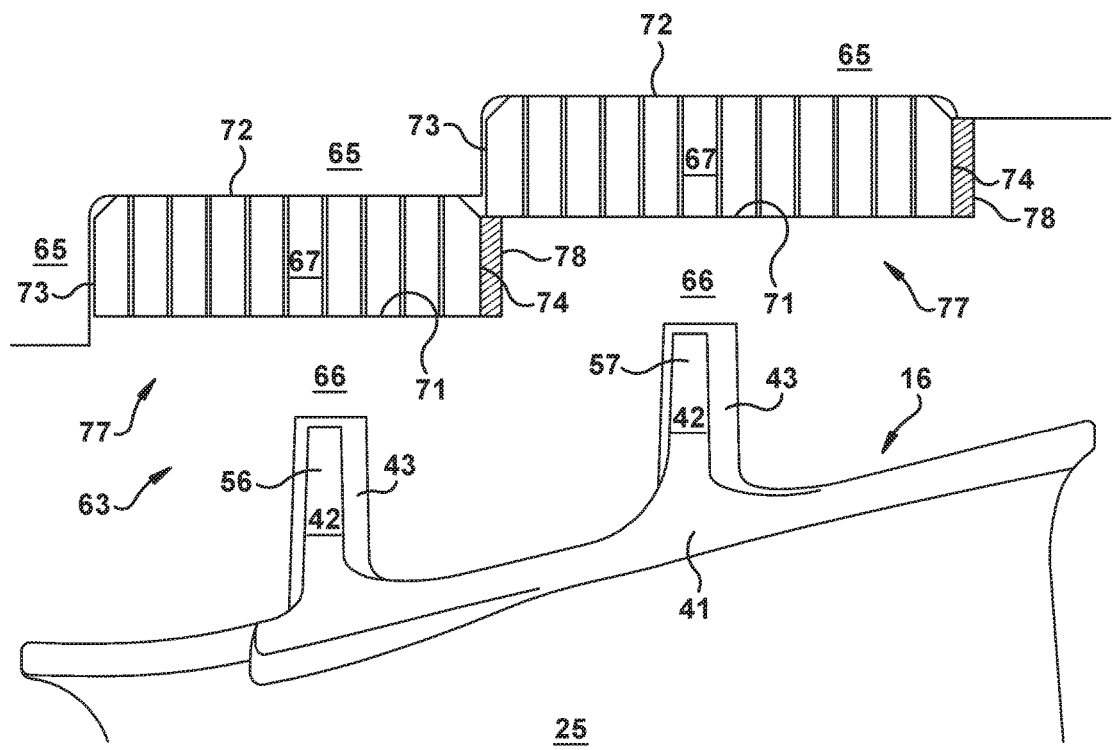
FIG. 13 is a section view of a tip shroud and abradable structure with a liner in accordance with alternative embodiments of the seal of the present invention.
Figure 14:
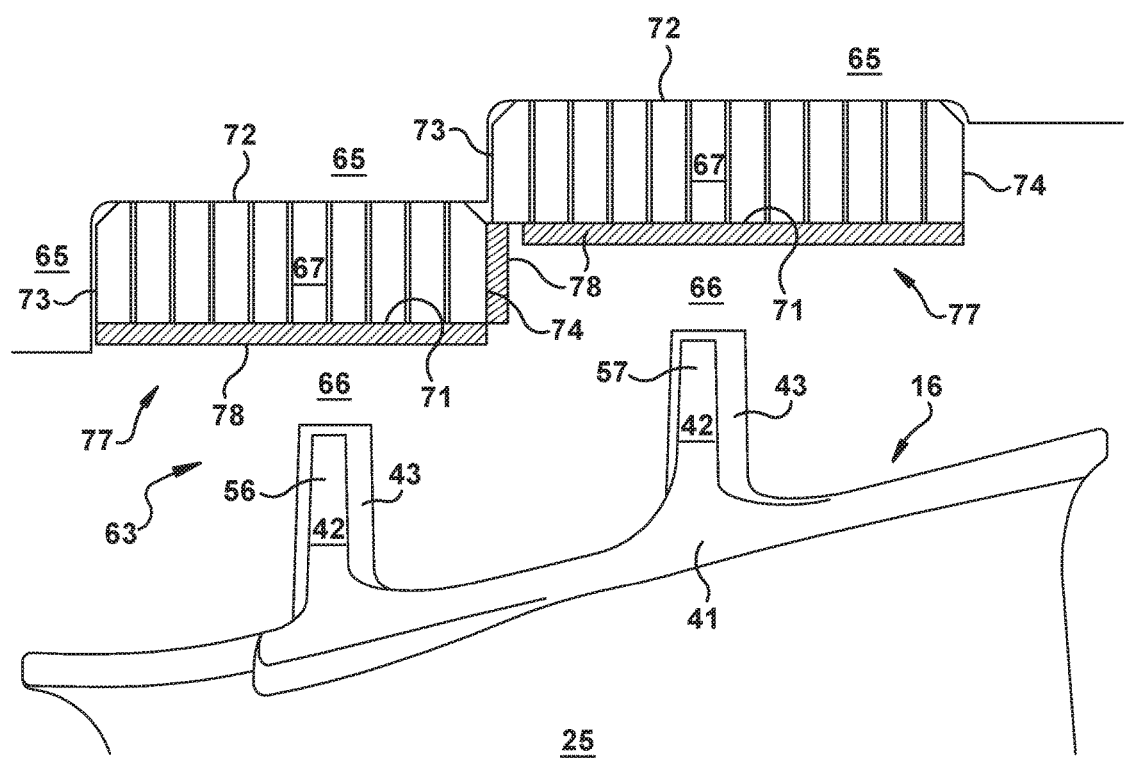
FIG. 14 is a section view of a tip shroud and abradable structure with a liner in accordance with alternative embodiments of the seal of the present invention.

According to other exemplary embodiments, as illustrated in FIGS. 10, 11, 13, and 14, the liner 78 of the pad 77 may be applied to the abradable structure 67 so that it covers the aftward outer surface 74. As shown in FIGS. 11 and 14, the coverage of the liner 78 to the aftward outer surface 74 may be in addition to the liner 78 covering the inboard outer surface 71 of the abradable structure 67. According to other exemplary embodiments, as illustrated in FIGS. 12 through 14, the liner 78 may be applied to abradable structures 67 so to form dual pads 77 that are arranged so to axially align, respectively, with dual seal rails 42 formed on the tip shroud 41 of the rotor blade 16.

The liner 78 may be formed using suitable materials in accordance with the anticipated conditions within the hot gas path of the gas turbine and the functionality described herein. The liner 78 may be formed of the same material as that used to construct the abradable structure 67. Alternatively, the liner 78 may be constructed with a material that is different than that used to form the abradable structure 67. According to one example, an alloy such as Haynes 214 may be used to form both the abradable structure 67 and the liner 78. In this case, a thin strip of the alloy may be used to form the liner 78, with the strip being attached to the abradable structure 67 via any conventional attachment process, such as welding or brazing. The thickness of the strip may be increased or decreased in order to manage the wear to the seal rails 42 of the rotor blades 16 during operation. Other materials also may be used to construct the liner 78, such as other metal alloys or ceramics, as may be apparent to one of ordinary skill in the applicable technical arts. According to another exemplary embodiment, additive manufacturing processes, such as direct metal laser melting (DMLM), may be used to form or "print" the abradable structure 67 and liner 78 as a single piece. According to other embodiments, the liner 78 may be applied to the abradable structure 67 as a coating.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

That which is claimed:

1. A seal in a gas turbine for sealing a radial gap defined between a rotating structure and a stationary structure, wherein the rotating structure comprises a row of rotor blades, the seal comprising:
    a pad attached to the stationary structure;
    wherein the pad comprises:
        an abradable structure comprising an inboard outer surface; and
        a liner attached to and covering a portion of the inboard outer surface of the abradable structure,
    wherein the liner comprises a first portion spaced from a second portion to define a coverage window therebetween on the inboard outer surface of the abradable structure; and
    wherein a center of the coverage window is substantially axially aligned with at least a portion of the rotor blades.

2. The seal of claim 1, wherein the gas turbine comprises a turbine having an annular flowpath through which a working fluid is directed;
    wherein the annular flowpath is defined by an inner radial boundary and an outer radial boundary; and
    wherein the stationary structure to which the pad is attached defines an axial section of the outer radial boundary of the annular flowpath, the axial section coinciding axially with an axial position of the row of rotor blades.

3. The seal according to claim 2, wherein the abradable structure comprises the inboard outer surface and an outboard outer surface;
    wherein:
        the inboard outer surface of the abradable structure opposes the row of rotor blades across the radial gap; and
        the outboard outer surface of the abradable structure faces the stationary structure and attaches thereto;
    wherein the abradable structure comprises a forward outer surface and an aftward outer surface;
    wherein:
        the forward outer surface extends between the inboard outer surface and the outboard outer surface at a forward end of the abradable structure; and
        the aftward outer surface extends between the inboard outer surface and the outboard outer surface at an aftward end of the abradable structure.

4. The seal according to claim 3, wherein the inboard outer surface of the abradable structure comprises the portion of the outer surface of the abradable structure that is covered by the liner.

5. The seal according to claim 3, wherein the aftward outer surface of the abradable structure comprises the portion of the outer surface of the abradable structure that is covered by the liner.

6. The seal according to claim 3, wherein the inboard outer surface and the aftward outer surface of the abradable structure comprises the portion of the outer surface of the abradable structure that is covered by the liner.

7. The seal according to claim 3, wherein orientation characteristics of the turbine include:
    radial, axial, and circumferential directions defined relative to a central axis of the turbine; and
    forward and aftward directions defined relative to a forward end of the turbine, at where the working fluid enters the turbine, and an aftward end of the turbine, at where the working fluid exits the turbine.

8. The seal according to claim 7, wherein the row of rotor blades comprises rotor blades circumferentially arranged about a rotor disk, wherein each of the rotor blades comprises:
    an airfoil defined between a pressure face and a laterally opposed suction face, wherein the pressure face and the suction face extend axially between opposite leading and trailing edges and radially between an outboard airfoil tip and an inboard end;
    a tip shroud attached to the outboard tip of the airfoil, the tip shroud comprising an axially and circumferentially extending planar component; and
    a seal rail that protrudes radially from an outboard surface of the tip shroud and extends circumferentially along a length;
    wherein:
        the seal rail defines an outboard most tip for each of the rotor blades such that, cumulatively, the seal rails of the rotor blades comprises an outboard most edge of the row of rotor blades;
        the inboard outer surface of the abradable structure defines an inboard most surface of the abradable structure; and
        the abradable structure is configured such that the inboard outer surface extends circumferentially in approximate spaced relation to the seal rails of the rotor blades.

9. The seal according to claim 8, wherein the forward end of the abradable structure and the aftward end of the abradable structure define an axially range of the abradable structure; and wherein the row of rotor blades is positioned such that an axial position for the seal rail of each of the rotor blades is inside the axially range of the abradable structure.

10. The seal according to claim 9, wherein, across the radial gap, the inboard outer surface of the abradable structure directly opposes the outboard most edge of the row of rotor blades; and wherein the inboard outer surface of the abradable structure comprises the portion of the outer surface of the abradable structure that is covered by the liner.

11. The seal according to claim 10, wherein the inboard outer surface of the abradable structure comprises an uneven surface comprising highpoints and lowpoints;

wherein the liner is configured to extend planarly between the highpoints of the inboard outer surface such that an inboard outer surface of the pad is smoother than the inboard outer surface of the abradable structure.

12. The seal according to claim 11, wherein the liner extends:

axially between a forward end of the abradable structure and an aftward end of the abradable structure; and circumferentially about a flowpath of the turbine.

13. The seal according to claim 10, wherein the inboard outer surface of the abradable structure comprises an uneven surface comprising highpoints and lowpoints;

wherein the liner comprises a coating that, upon application, fills in the lowpoints such that an inboard outer surface of the pad is substantially planar.

14. The seal according to claim 10, wherein the abradable structure comprises thin-walled cells;

wherein the thin-walled cells are arranged parallel to each other and oriented such that each of the thin walled cells extends between an opening formed on the inboard outer surface and an opening formed on the outboard outer surface of the abradable structure;

wherein the thin-walled cells maintain a substantially constant cross-sectional shape between the openings formed on the inboard outer surface and the outboard outer surface of the abradable structure; and wherein the liner encloses the openings of the thin-walled cells formed on the inboard outer surface of the abradable structure.

15. The seal according to claim 9, wherein the aftward outer surface of the abradable structure comprises the portion of the outer surface of the abradable structure that is covered by the liner;

wherein the aftward outer surface of the abradable structure comprises an uneven surface comprising highpoints and lowpoints;

wherein the liner is configured to extend planarly between the highpoints of the aftward outer surface such that an aftward outer surface of the pad is smoother than the aftward outer surface of the abradable structure.

16. The seal according to claim 9, wherein the aftward outer surface of the abradable structure comprises the portion of the outer surface of the abradable structure that is covered by the liner;

wherein the aftward outer surface of the abradable structure comprises a corrugated surface, the corrugated surface describing a series of parallel ridges and furrows that extend longitudinally between the inboard outer surface and the outboard outer surface of the abradable structure;

wherein the liner is configured to extend planarly between the ridges of the corrugated surface.

17. The seal according to claim 9, wherein the aftward outer surface of the abradable structure comprises the portion of the outer surface of the abradable structure that is covered by the liner;

wherein the aftward outer surface of the abradable structure comprises a corrugated surface, the corrugated surface describing a series of parallel ridges and furrows that extend longitudinally between the inboard outer surface and the outboard outer surface of the abradable structure;

wherein the liner comprises a coating that, upon application, fills the furrows of the corrugated surface such that a downstream outer surface of the pad is substantially planar.

18. A seal in a gas turbine for sealing a radial gap defined between a rotating structure and a stationary structure, wherein the rotating structure comprises circumferentially arranged rotor blades that each have a tip shroud supported at an outboard tip of an airfoil, the seal comprising:

seal rails protruding from the outboard surface of the tip shroud, the seal rails including a forward seal rail that is positioned forward of and oriented substantially parallel to an aftward seal rail;

a forward pad attached to the stationary structure so to align axially with the forward seal rail;

an aftward pad attached to the stationary structure so to align axially with the aftward seal rail;

wherein the forward pad comprises:
an abradable structure; and
a liner that attaches to and covers a portion of an outer surface of the abradable structure of the forward pad;

wherein the aftward pad comprises:
an abradable structure; and
a liner that attaches to and covers a portion of an outer surface of the abradable structure of the aftward pad.

19. The seal according to claim 18, wherein the abradable structure for each of the forward pad and the aftward pad comprises an inboard outer surface and an outboard outer surface;

wherein:
the inboard outer surface of the abradable structure of the forward pad axially aligns with and opposes the forward seal rails of the rotor blades across the radial gap; and the inboard outer surface of the abradable structure of the aftward pad axially aligns with and opposes the aftward seal rails of the rotor blades across the radial gap;

wherein the abradable structure for each of the forward pad and the aftward pad comprises a forward outer surface and an aftward outer surface located, respectively, at a forward end and aftward end of the abradable structure;

wherein at least one of the inboard outer surface and the aftward outer surface of the abradable structure of the forward pad comprises the portion of the outer surface of the abradable structure of the forward pad that is covered by the liner;

wherein at least one of the inboard outer surface and the aftward outer surface of the abradable structure of the aftward pad comprises the portion of the outer surface of the abradable structure of the aftward pad that is covered by the liner.

* * * * *